(12) United States Patent
Hardin et al.

(10) Patent No.: US 6,502,053 B1
(45) Date of Patent: Dec. 31, 2002

(54) COMBINATION PASSIVE AND ACTIVE SPEED DETECTION SYSTEM

(75) Inventors: Larry C. Hardin, Bandon, OR (US); Larry V. Nash, Gold Beach, OR (US)

(73) Assignee: Larry Hardin, Bandon, OR (US)

( * ) Notice: Subject to any disclaimer, the term of this patent is extended or adjusted under 35 U.S.C. 154(b) by 128 days.

(21) Appl. No.: 09/591,869

(22) Filed: Jun. 12, 2000

(51) Int. Cl.[7] ................................. G08G 1/01
(52) U.S. Cl. .................. 702/143; 702/96; 702/142; 702/149; 702/151; 702/183
(58) Field of Search ............ 702/96, 142–149, 702/151, 183, FOR 103, FOR 104, FOR 123, FOR 124, FOR 130, FOR 134, FOR 135, FOR 150, FOR 151, FOR 155, FOR 170; 701/96, 301; 382/103, 104, 106, 107; 340/903, 936, 937, 942, 435, 557, 554, 555; 356/4.01, 27; 342/54, 104, 461; 348/148, 169, 135, 139, 140

(56) References Cited

U.S. PATENT DOCUMENTS

| | | | | |
|---|---|---|---|---|
| 4,017,716 A | * | 4/1977 | Teiling | 235/61.5 S |
| 4,796,997 A | * | 1/1989 | Svetkoff et al. | 356/376 |
| 5,128,874 A | * | 7/1992 | Bhanu et al. | 364/461 |
| 5,157,451 A | * | 10/1992 | Taboada et al. | 356/5 |
| 5,182,564 A | * | 1/1993 | Burkett et al. | 342/53 |
| 5,304,980 A | * | 4/1994 | Maekawa | 340/435 |
| 5,461,357 A | * | 10/1995 | Yoshioka et al. | 340/435 |
| 5,515,042 A | * | 5/1996 | Nelson | 340/937 |
| 5,586,063 A | * | 12/1996 | Hardin et al. | 364/561 |
| 5,633,705 A | * | 5/1997 | Asayama | 356/3.14 |
| 5,699,149 A | * | 12/1997 | Kuroda et al. | 356/4.01 |
| 5,742,699 A | * | 4/1998 | Adkins et al. | 382/107 |
| 5,877,969 A | * | 3/1999 | Gerber | 364/562 |
| 5,938,717 A | * | 8/1999 | Dunne et al. | 701/117 |
| 6,067,110 A | * | 5/2000 | Nonaka et al. | 348/148 |
| 6,134,497 A | * | 10/2000 | Hayashi et al. | 701/70 |
| 6,169,940 B1 | * | 1/2001 | Jitsukata et al. | 701/23 |
| 2002/0000921 A1 | * | 1/2002 | Hutchinson | 340/942 |

FOREIGN PATENT DOCUMENTS

JP 58146877 * 9/1983

OTHER PUBLICATIONS

"Laser Ranging Device Keeps Cars Apart" by Winfried Arndt, Jul. 1990, pp. 133–134.*

* cited by examiner

Primary Examiner—Marc S. Hoff
Assistant Examiner—Carol S. W. Tsai
(74) Attorney, Agent, or Firm—Chernoff, Vilhauer, McClung & Stenzel, LLP

(57) ABSTRACT

A combination passive and active detection system including a passive speed and range detection system able to sense the speed and range of a moving object and an active speed detection system able to sense the speed and range of a moving object. The passive speed detection system is preferably an electro-optical speed and range detection system. The active speed detection system is preferably a laser speed and range detection system. The combination detection system preferably is selectively operable in a dual operational mode, a "passive-only" operational mode, and "active-only" operational mode, a triggering operational mode, and an active recording operational mode.

8 Claims, 15 Drawing Sheets

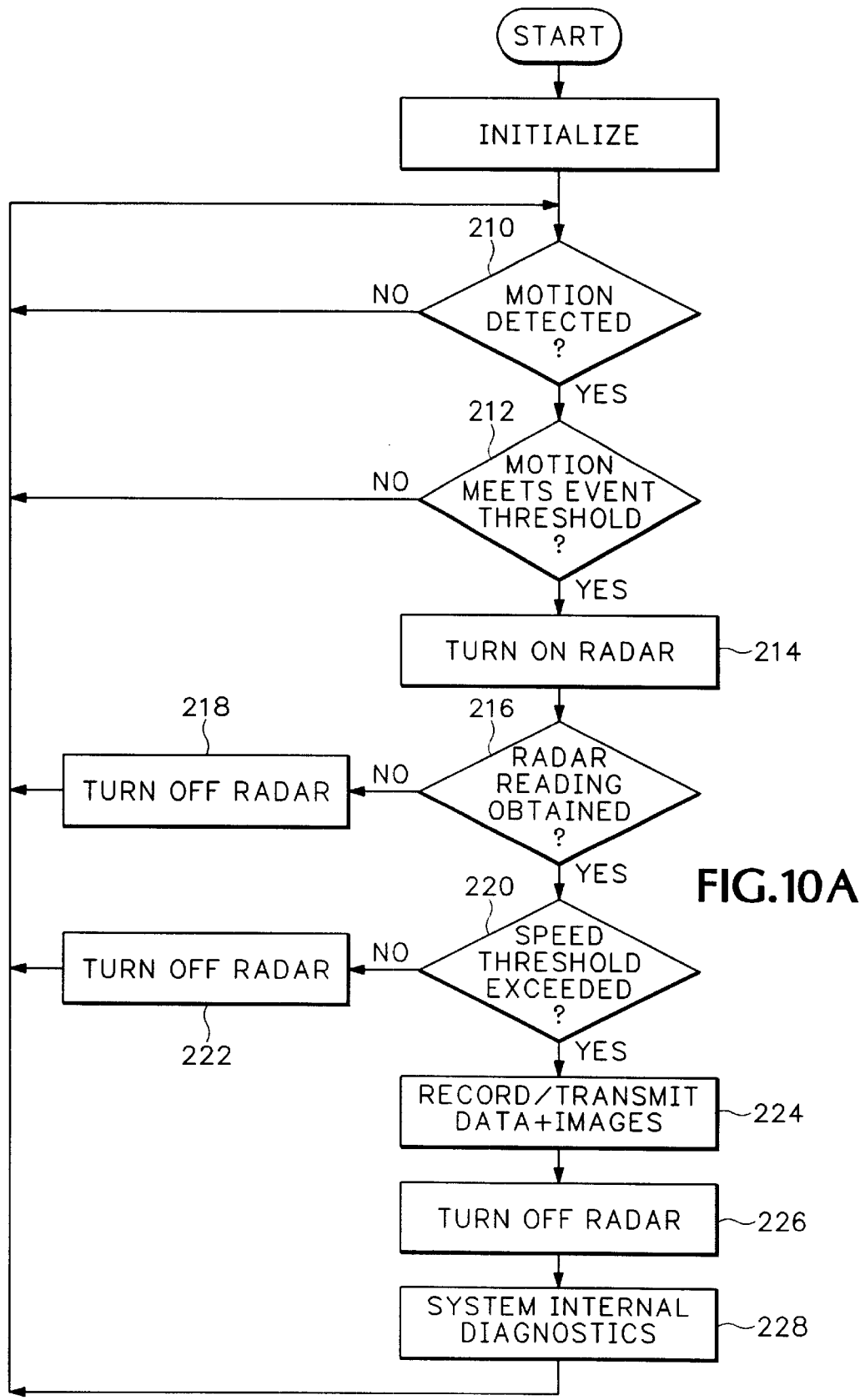

COMBINATION PASSIVE AND ACTIVE SPEED DETECTION SYSTEM

BACKGROUND OF THE INVENTION

The present invention relates to a system that combines a passive speed detection system with an active speed detection system and then transmits the information obtained to one or more end users.

U.S. Pat. No. 5,586,063, which is assigned to the assignee of the present invention and is incorporated herein, sets forth a practical passive electro-optical speed and distance measuring system. Summarily, this passive system includes a pair of camera lenses positioned along a common baseline a predetermined distance apart and to capture images of a target at different times. The camera lenses are focused on light sensitive pixel arrays which capture target images at offset positions in the line scans of the pixel arrays. A video signal processor with a computer determines the location of the offset positions and calculates the range to the target by solving the trigonometry of the triangle formed by the two camera lenses and the target. Once the range to the target is known at two different times the speed of the target is calculated.

There are also many active speed detection systems, the most common of which are laser and radar speed detection systems. Active speed detection systems require a transmitter to transmit energy towards a moving target which is then reflected back to a receiver. Various schemes are then used for measuring the time of transmission and the signal return or Doppler frequency shift-in order to calculate the range to the target and its speed.

Active speed detection systems have several problems. For example, generally a trained operator must aim the transmitter at the object of interest and trigger the system at the proper time. Further, if the transmitter is left on continuously, the transmitter can easily be detected and circumvented. Since these systems are not imaging systems they cannot identify the objects. Accordingly, identification may be accomplished by a human operator at the measurement site that can add human error, by a still film camera that is unable to provide images in real time and therefore cannot be acted upon immediately, or by film or video recording which is slow, bulky, expensive, and limits the number of images that can be captured. Further, images of the targeted object acquired by these systems cannot be quickly transmitted to a remote location.

It should be noted that there are specific problems related to active laser speed detection systems. For example, because of the narrow beam-width of the laser, it must be carefully aimed at an object of interest by a trained operator.

It also should be noted that there are specific problems related to active radar speed detection systems. For example, if the radar is unattended and continuously transmitting, it is easily detected and circumvented. Further, the transmitted and received radar beam angle is so wide that the radar beam can often be reflected from other moving objects in addition to the targeted object. Radar beam reflections from multiple moving objects are a common source of error with Doppler radar systems and limit the conditions under which they can be used.

Combining different-technology sensor systems into a single system where each sensor covers part or all of the same field-of-view is called "sensor fusion." This approach is used in a number of military weapons systems to circumvent the limitations of any one sensor technology. For example, millimeter-wave radar systems have been combined with imaging infrared sensors in battlefield imaging sensors used for munitions aiming and guidance.

Problems also exist with known combination systems such as photo/laser and photo/radar systems. For example, photo/laser systems do not provide a speed measurement independent of the laser gun. Photo/radar systems do not provide speed measurement independent of the radar and also do not provide distance information. Photo/radar systems emit signals that are easy to detect and circumvent. Neither photo/laser systems nor photo/radar systems provide an image in real time to support immediate pursuit of speeders.

What is needed is a speed measurement system that overcomes the aforementioned problems of known systems.

BRIEF SUMMARY OF THE INVENTION

The combination of a passive speed detection system and an active speed detection system can measure highway vehicle speeds and distances. Preferably the passive speed detection system is the passive electrooptical (EO) speed and distance measuring system disclosed in U.S. Pat. No. 5,586,063, which is assigned to the assignee of the present invention and is incorporated herein. Preferably the active speed detection system is either a conventional laser system or a conventional radar system. The active and passive systems can be used separately and in various combinations depending on conditions and specific features desired.

The combination system improves the efficacy of the conventional active systems and provides additional features not possible with the traditional active systems alone. For example, radar alone cannot provide a distance measurement and laser alone cannot provide real-time recording and production of video images.

Some of the possible advantages of a combination passive/active speed detection system include: the ability to provide an image of the object pointed at by the active system; the video image of the measured object is provided in real-time; the video image and data may be transmitted immediately to one or more remote locations; the electronically-recorded images may be automatically sorted by computer software based on parameters such as calendar date, time-of-day, speeds, and frequencies-of-occurrence; two independent measurements of object speed can be automatically compared to increase the confidence level in both measurements; in certain operating modes the active system may be automatically actuated by the passive system at the correct object distance thus allowing for unmanned operation; the ability to provide an object image, speed and distance history up to, at the time of, and following the measurements; and the decrease in the susceptibility of the active system to defeat by countermeasures.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 10A is a flow chart diagram illustrating the operation of the system of FIG. 10.

DETAILED DESCRIPTION OF THE PREFERRED EMBODIMENTS

Figure 1A:
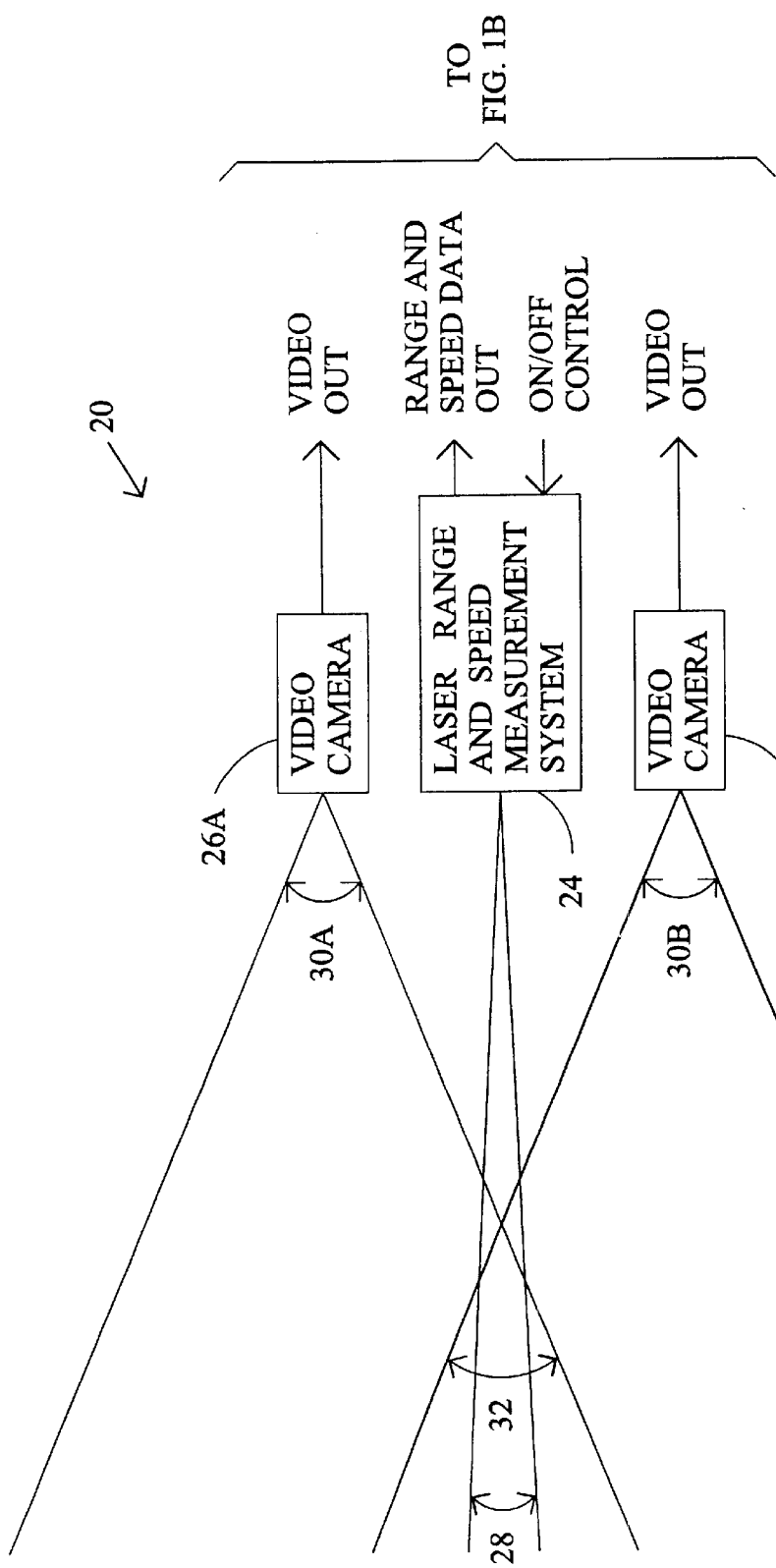
FIGS. 1A–1B are an exemplary schematic configuration of combination system of the present invention of an active laser speed detection system and a passive speed detection system.
Figure 1B:
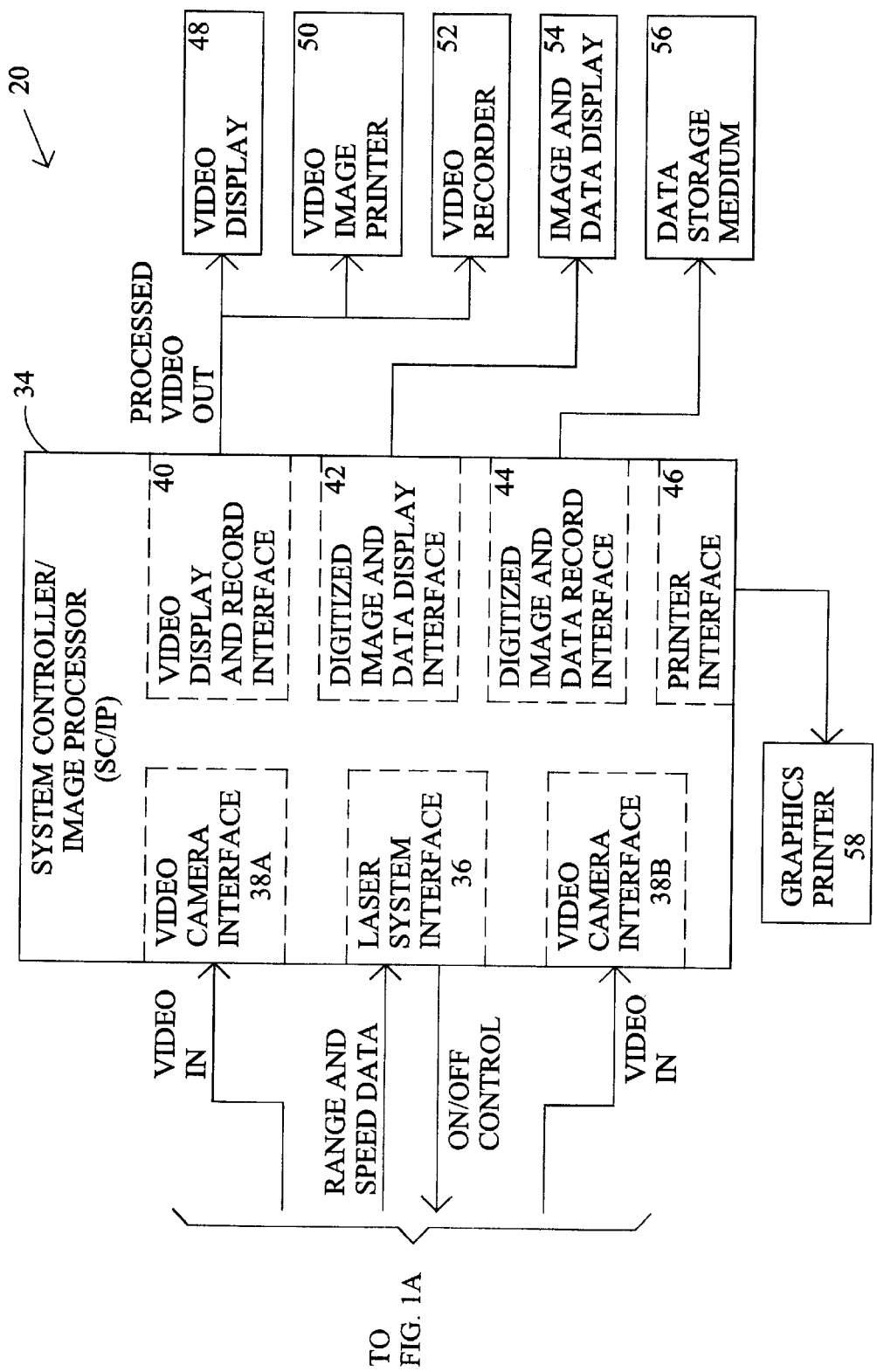
Figure 5A:
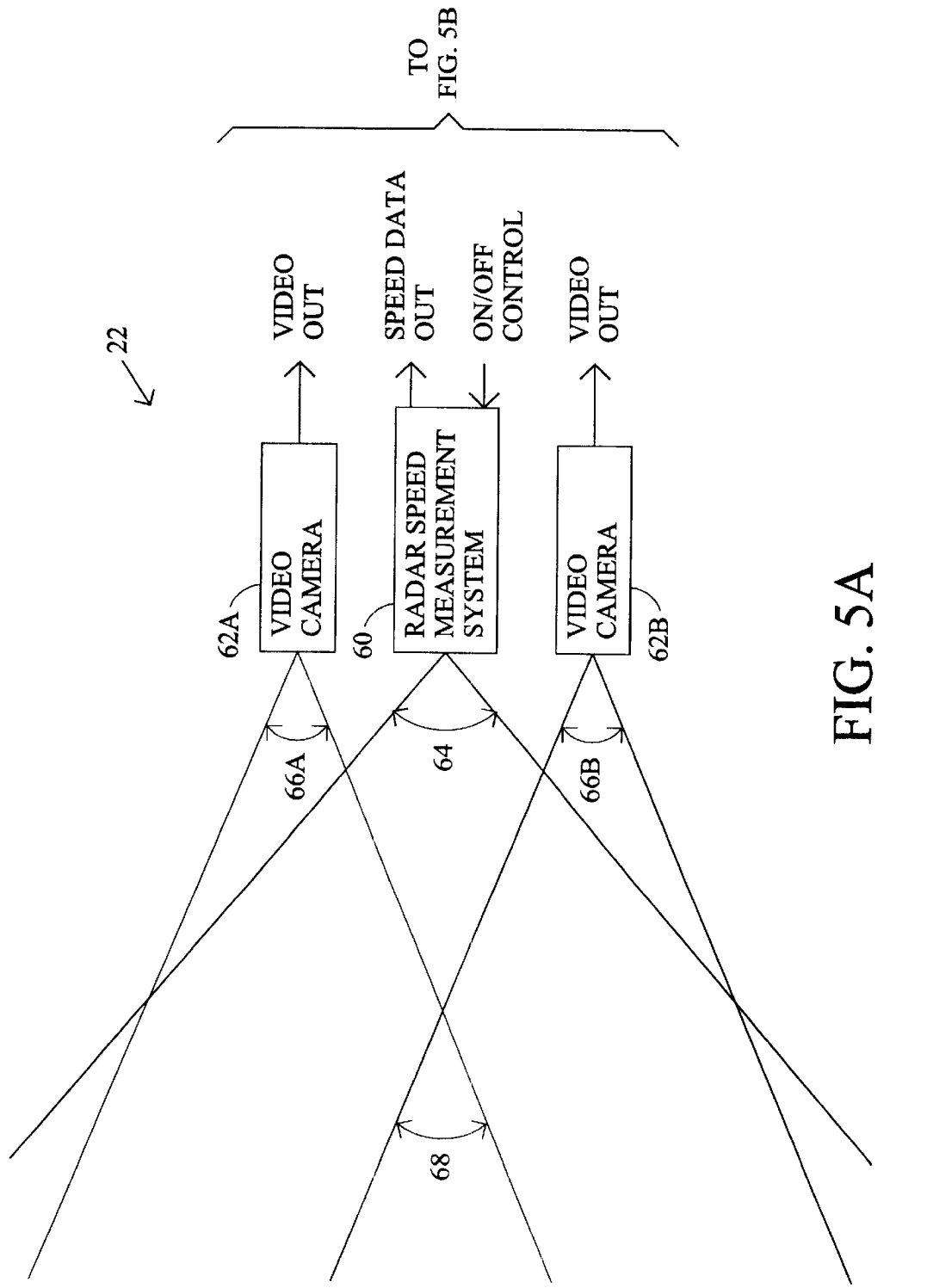
FIGS. 5A–5B are an exemplary schematic configuration of combination system of the present invention of an active radar speed detection system and a passive speed detection system.
Figure 5B:
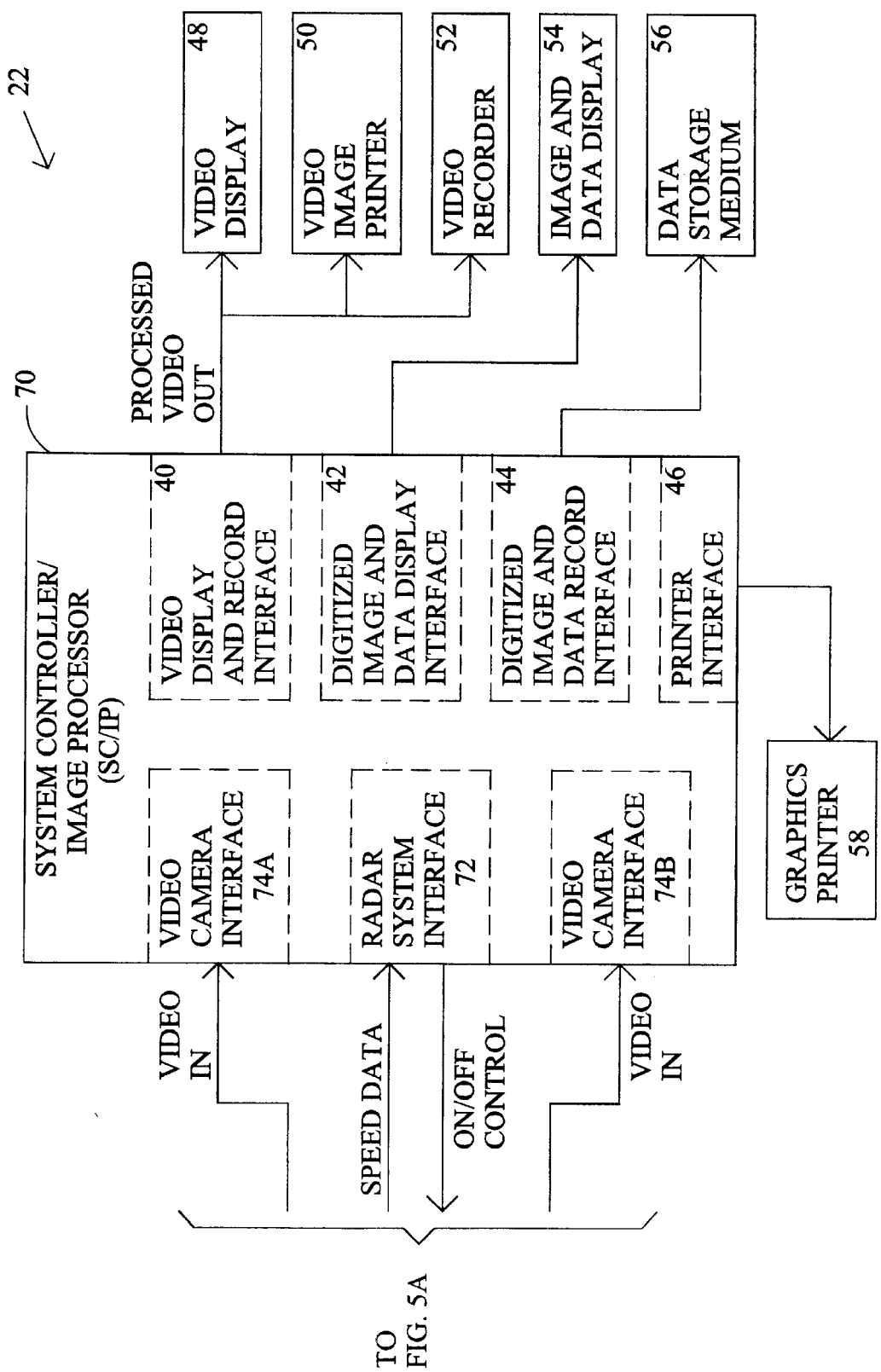

FIGS. 1A–1B and 5A–5B illustrate two embodiments of an active/passive combination system configuration of the present invention. Specifically, FIGS. 1A–1B show a schematic configuration of a laser/electro-optical combination system 20 of an active laser system and a passive system such as the electrooptical (EO) speed and distance measuring system disclosed in U.S. Pat. No. 5,586,063, which is assigned to the assignee of the present invention and is incorporated herein. FIGS. 5A–5B show a schematic configuration of a radar/EO combination system 22 of an active radar system such as a Doppler radar and a passive system such as the electro-optical (EO) speed and distance measuring system disclosed in U.S. Pat. No. 5,586,063, which is assigned to the assignee of the present invention and is incorporated herein. There are any similarities between the laser/EO and the radar/EO combination systems. Accordingly, parts that are identical will be identified with the same reference umbers.

Laser/Electro-Optical Combination System

Turning first to the laser/EO combination system 20 shown in FIGS. 1A–1B, this system includes a laser range and speed measurement system such as a laser speed gun 24 and an EO system shown as two video cameras 26a, 26b. The laser speed gun 24 may be a conventional laser speed "gun" with an electrical triggering option and a computer interface option for outputting measurement data. The video cameras 26a, 26b are separated by a baseline (B) distance that is small compared to the shortest range to an object of interest.

The laser system 24 has a laser system beam angle (BA) 28 and the video cameras 26a, 26b of the EO system have video camera fields-of-view (FOV) 30a, 30b. The video cameras 26a, 26b have a common FOV 32. Centering the laser beam in the video common FOV 32 enables cross-checking of the passive and active sensor speed and distance measurements. If the two sensors agree, and there is only one object imaged by and in the measurement aperture of the EO sensor, the probability of an erroneous or ambiguous measurement due to multiple objects in the field-of-view is eliminated.

Figure 2:
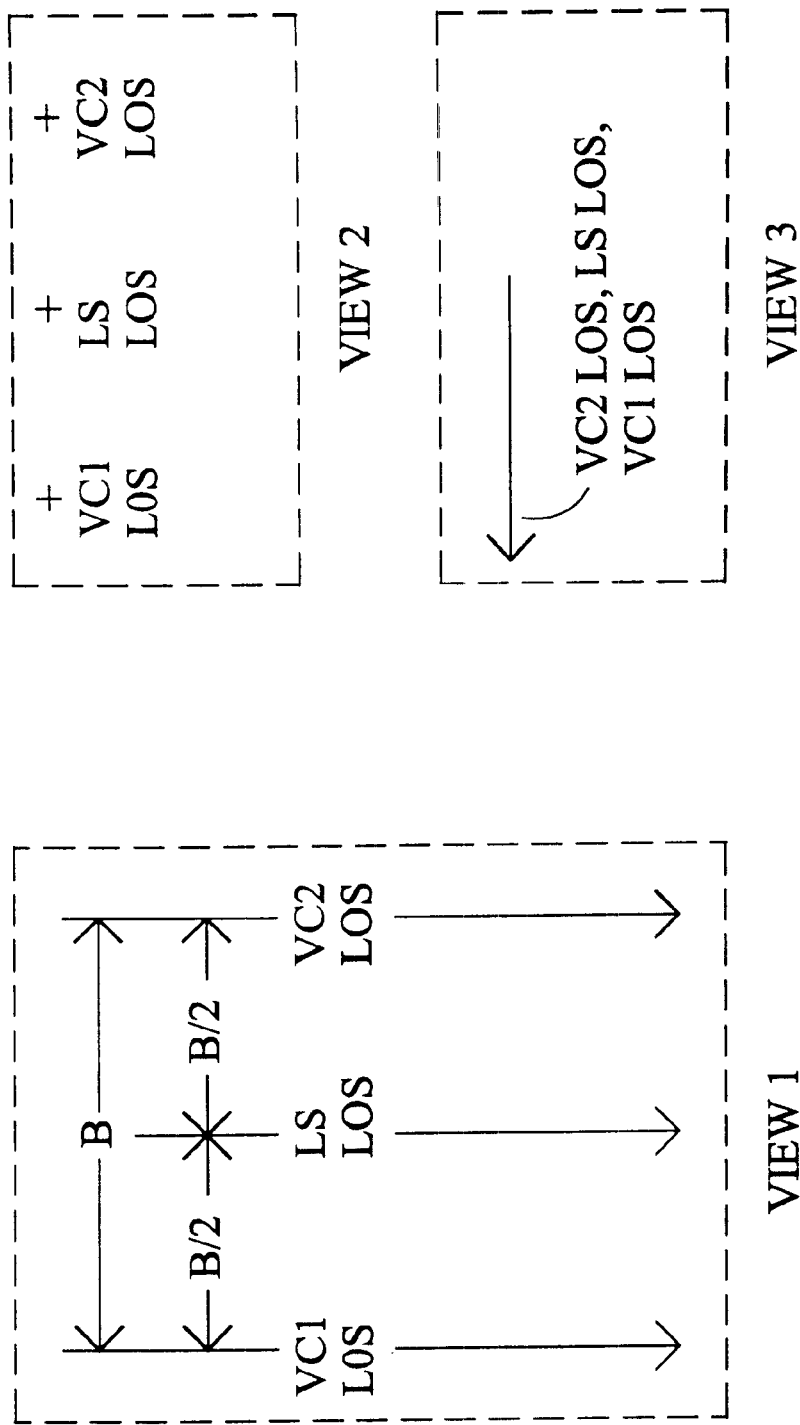
FIG. 2 is an exemplary depiction of system lines-of-sight relationships between an active laser speed system and a passive speed detection system.
Figure 3:
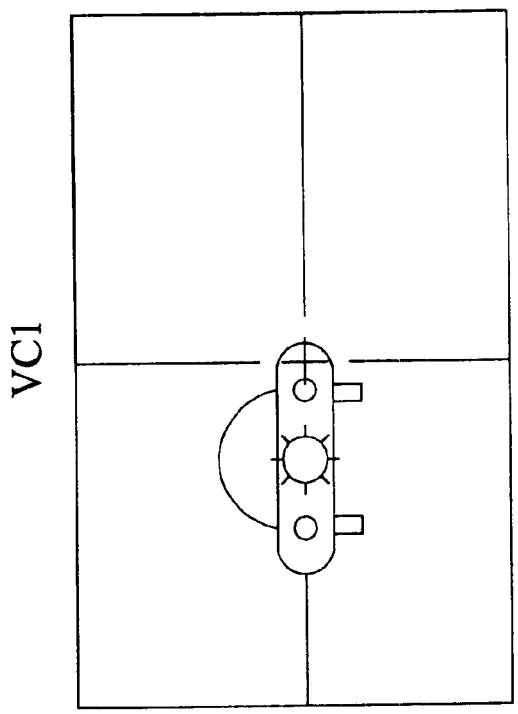
FIG. 3 is an exemplary depiction of images obtained by camera one and camera two of the present invention.
Figure 3:
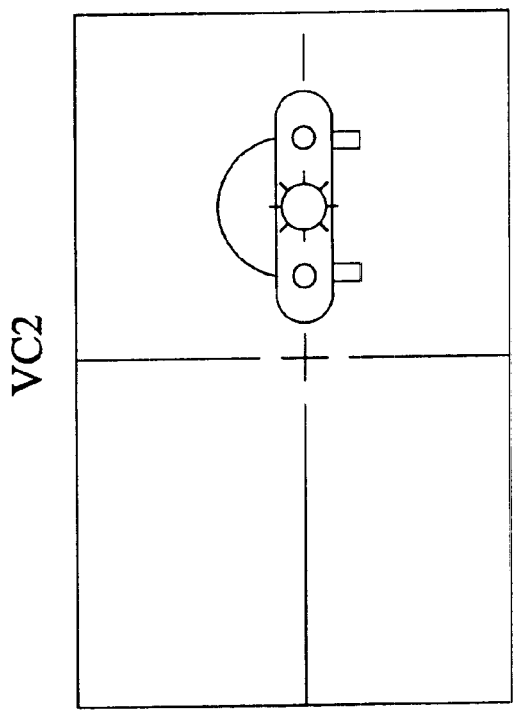

Views 1, 2, and 3 of FIG. 2 are three mutually orthogonal views of the lines-of-sight of the video cameras 26a, 26b (designated as VC1 and VC2) and the laser system 24 (LS). As shown, the lines-of-sight (LOS) of the video cameras 26a, 26b are parallel to each other and perpendicular to the baseline. The line-of-sight of the laser beam is parallel to the lines-of-sight of the video cameras and in the same plane. The laser system is situated at the midpoint (B/2) of the baseline. Referring to FIG. 3, when the laser system 24 is pointed at the center of the object, the images of the object are displaced from the center of each camera's video display due to the cameras, (positions) being at different locations on the baseline. The laser reflection from the object is seen in both camera views in the same location with respect to the object.

The laser system 24 and video cameras 26a, 26b provide information and data to the system controller/image processor (SC/IP) 34. The SC/IP 34 controls the system. For example, the SC/IP 34 executes the EO system firmware as described in U.S. Pat. No. 5,586,063, which is assigned to the assignee of the present invention and is incorporated herein. It also controls the multiple interfaces as described below. The SC/IP 34 may include a laser system interface 36, video camera interfaces 38a, 38b, a video display and record interface 40, a digitized image and data display interface 42, a digitized image and data record interface 44, and a printer interface 46. These hardware interfaces may be implemented physically and/or with software. It should be noted that the SC/IP 34 may be one or more general-purpose digital computers with special I/O components, operating under control of software written specifically for the laser/EO system 20. In a multiple computer SC/IP 34, one computer is designated as the master and assigns tasks to the others.

The laser system interface 36 interfaces with the laser system 24. Specifically, the laser system 24 provides range and speed data to the laser system interface 36 and the laser system interface 36 provides on/off control of the laser system 24. The laser system interface 36 may be a conventional general-purpose computer serial port.

The video camera interfaces 38a, 38b interface with respective video cameras 26a, 26b by accepting video output therefrom. If standard analog video cameras are used the interfaces are conventional video frame grabbers. If digital video cameras are used, these are digital camera interface devices.

The video display and record interface 40 may interface with one or more of a video display 48, a video image printer 50, and a video recorder 52. The video display 48 may be a standard closed-circuit TV monitor. The video image printer 50 may be a standard single-frame video printer. The video recorder 52 may be a conventional VHS videotape recorder with a computer control interface option.

The digitized image and data display interface 42 connects to an image and data display such as a computer video monitor 54. The digitized image and data display interface 42 may be a standard "VGA-like, interface used by computers to operate conventional computer video monitors.

Figure 4:
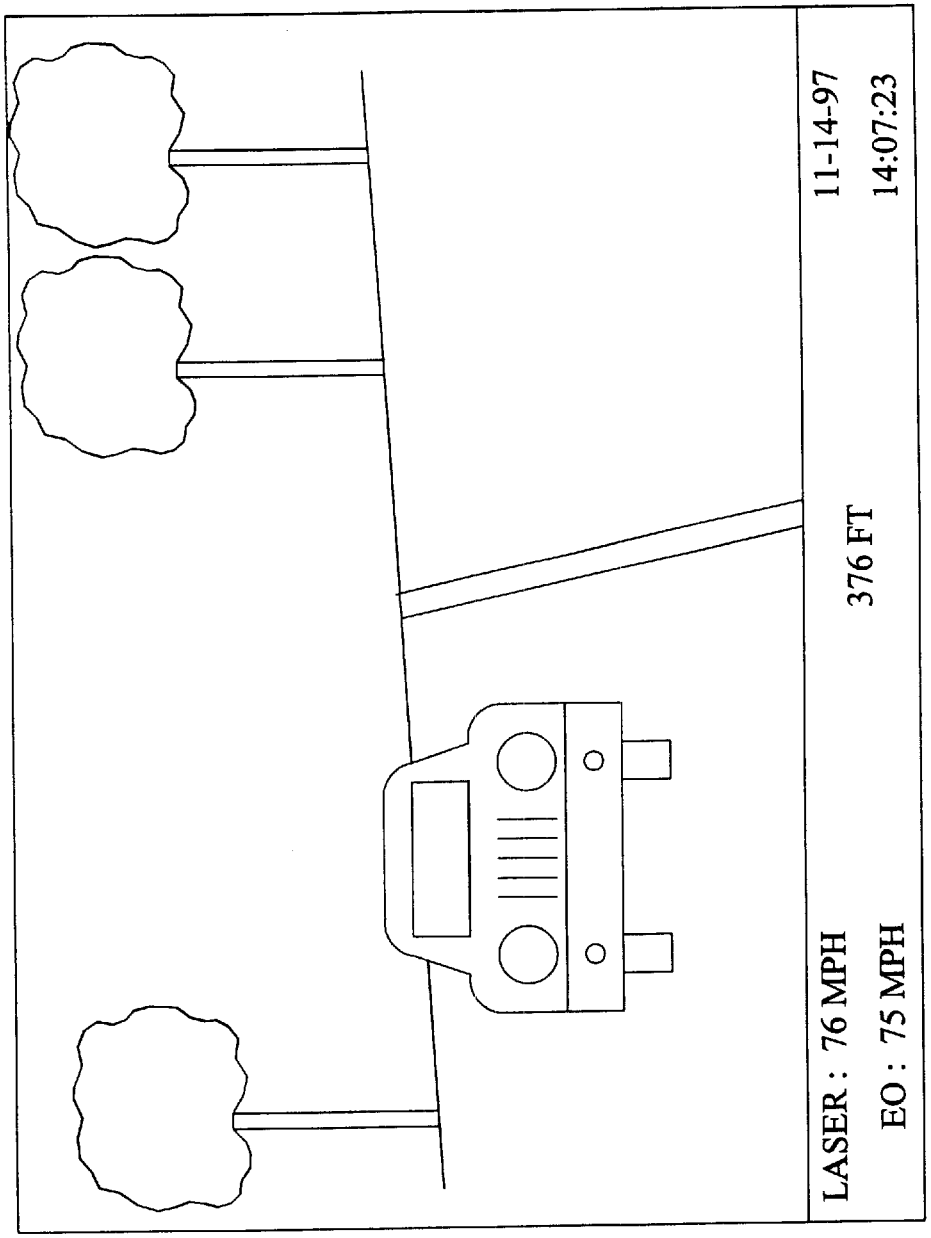
FIG. 4 is an exemplary display format showing the alphanumeric data overlay on the video image.

The digitized image and data record interface 44 connects to a data storage medium 56. The digitized image and data record interface 44 may be a standard interface used by general-purpose computers to interface with memory systems. The data storage medium 56 may be a conventional computer memory device. In one embodiment of the invention, only those video fields actually captured (and containing the measurement alphanumerics such as the image of FIG. 4) are stored. This permits extended operation without exceeding the capacity of a typical data storage medium 56. The video recorder 52 may be used to store video before, during, and after the captured frame.

The printer interface 46 interfaces with a graphics printer 58. The printer interface 46 may be a conventional computer printer interface. The graphics printer 58 may be a conventional computer printer for printing the digitized images and data. In one embodiment the printer 58 is used to print selected static images. For example, at the display 48 the user sees a continuous conventional television-like display of the traffic. When the system or the user detects a desired image, a measurement is made and the user sees a static image on the video display 48. The static image may be, for example, the exemplary digital video image of a vehicle, with all the measurement results overlaid at the bottom of the image in alphanumeric form such as that shown in FIG. 4. The printer 58 is then activated. The video display 48 then reverts back to the continuous display format.

The video display and record interface 40, the digitized image and data display interface 42, the digitized image and data record interface 44, and the printer interface 46 may interface locally or remotely with their respective hardware. For example, video information and digitized images and data produced by the system 20 can be transmitted over data links included, but not limited to radio frequency data links (point-to-point and broadcast), cable, telephone lines, cell phone systems, and the internet. These data links can provide information to multiple concurrent end-users.

In addition to the advantages set forth in the Background of the Invention, the laser/EO combination system 20 may include several advantages particular to combining a laser system with a passive system. For example, the images from the video cameras 26a, 26b shown in FIG. 3 will show the laser reflection from the object, confirming that the laser is actually impinging on the object of interest and not on some other object. Further, because video cameras 26a, 26b used in the EO system can be made sensitive to the laser energy, the signal-to-noise ratio of the EO sensor can be increased due to the laser energy reflected from the object of interest and thereby the accuracy of the EO system can be increased. Further, the illumination of the object of interest by the laser energy can also improve the night-time or low light level capability of the EO system.

Radar/Electro-Optical Combiantion System

Turning next to the radar/EO combination system 22 shown in FIGS. 5A–5B, this combination includes a radar speed measurement system shown as a Doppler radar 60 and an EO range and speed measurement system shown as two video cameras 62a, 62b. The radar system 60 may be a conventional radar speed "gun" with an electrical triggering option and a computer interface option for outputting measurement data. The video cameras 62a, 62b are separated by a baseline (B) distance that is small compared to the shortest range to an object of interest.

The radar system 60 has a beam angle (BA) 64 or an angular beam width, and the video cameras 62a, 62b of the EO system have video camera FOVs 66a, 66b. The video cameras 62a, 62b have a common FOV 68. The beam angle 64 of the radar system 60 is much greater than the EO system common FOV 68 angle. Combining the sensor fields-of-view enables cross-checking of the passive and active sensor speed and tracking history. If the two sensors agree, erroneous measurement is unlikely due to the EO system's contribution of a visual tracking history.

Figure 6:
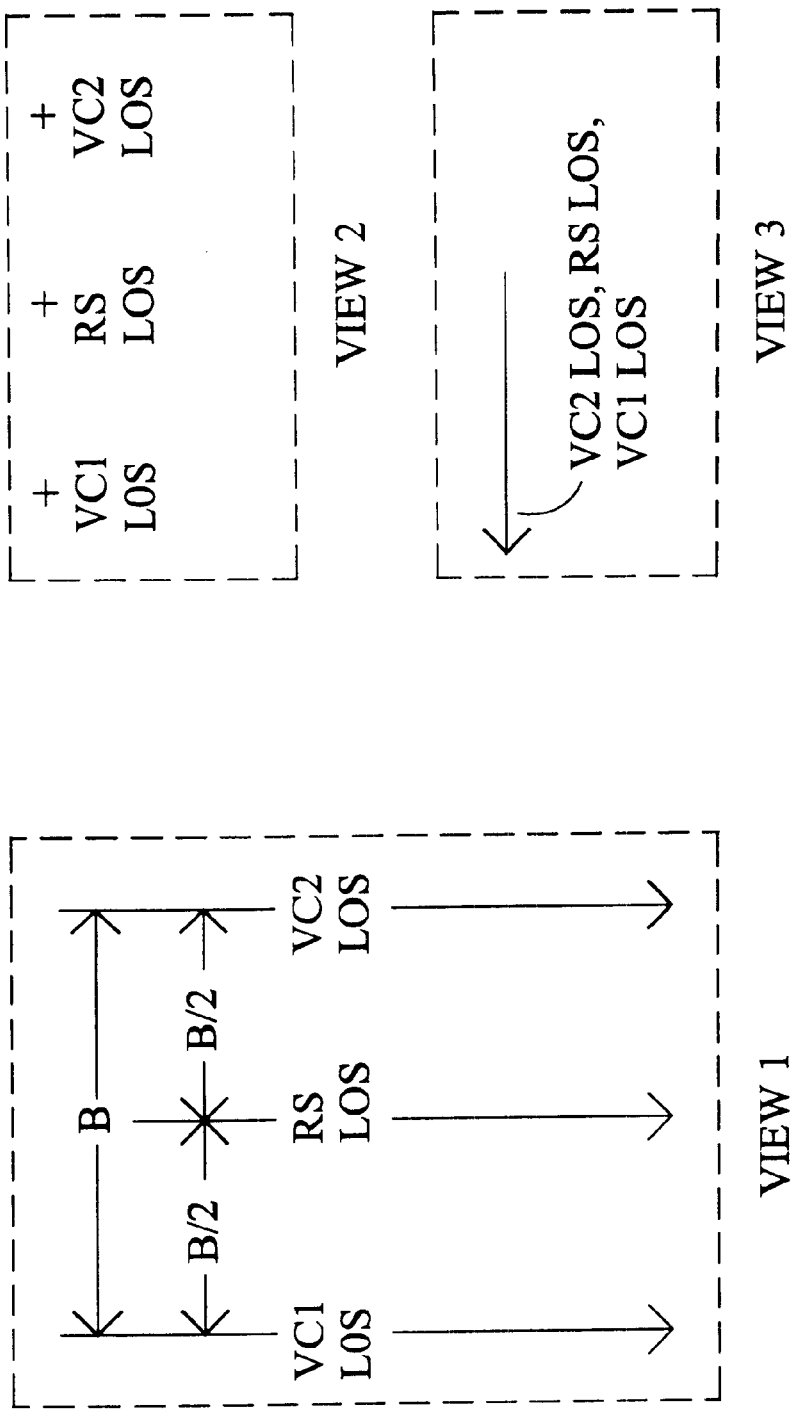
FIG. 6 is an exemplary depiction of system line-of-sight relationships between an active radar speed detection system and a passive speed detection system.

Views 1, 2, and 3 of FIG. 6 are three mutually orthogonal views of the lines-of-sight of the video cameras 62a, 62b (designated as VC1 and VC2) and the radar system 60 (RS). View 1 corresponds to the system of orientation shown in FIG. 5A. As shown, the lines-of-sight (LOS) of the video cameras 62a, 62b are parallel to each other and perpendicular to the baseline. The beam direction of the radar system is parallel to the lines-of-sight of the video cameras and in the same plane. The radar system is situated at the midpoint (B/2) of the baseline. The "+" of view 2 indicates the out-of-the-page direction.

The radar system 60 and video cameras 62a, 62b provide information and data to the system controller/image processor (SC/IP) 70 shown in FIG. 5B. The SC/IP 70 controls the system and functions in much the same manner as the SC/IP 34 of the laser/EO system 20. For example, it executes the EO system firmware. Further, the SC/IP controls the multiple interfaces including but not limited to a radar system interface 72, video camera interfaces 74a, 74b a video display and record interface 40, a digitized image and data display interface 42, a digitized image and data record interface 44, and a printer interface 46. These hardware interfaces may be implemented physically and/or with software. It should be noted that the SC/IP 70 may be one or more general-purpose digital computers with special I/O components, operating under control of software written specifically for the radar/EO system 22. Due to the similarity of the SC/IP 70 and the SC/IP 34, the features of the SC/IP 70 will be discussed only briefly here.

The radar system interface 72 interfaces with the radar system 60. Specifically, the radar system 60 provides speed data to the radar system interface 72 and the radar system interface 72 provides on/off control of the radar system 60. The radar system interface 72 may be a conventional general-purpose computer serial data port.

The video camera interfaces 74a, 74b interface with respective video cameras 62a, 62b by accepting video output therefrom. If standard analog video cameras are used the interfaces are conventional video frame grabbers. If digital video cameras are used, these are digital camera interface devices.

The video display and record interface 40 may interface with one or more of a video display 48, a video image printer 50, and a video recorder 52. The digitized image and data display interface 42 connects to a computer video monitor 54. The digitized image and data record interface 44 connects to a data storage medium (memory) 56. The printer interface 46 interfaces with a graphics printer 58. These features are discussed above in greater detail.

In addition to the advantages set forth in the Background of the Invention, the radar/EO combination system 22 may include several advantages particular to combining a radar system with a passive system. For example, the radar/EO system 22 provides a measurement of the distance from the system to the targeted object. It should be noted that Doppler radar alone cannot measure distances nor detect stationary objects (including objects that have come to a stop).

Combining the radar system 60 with the EO system also enables a "confidence level, to be established for the radar measurement without the necessity of a human operator. This feature is available because the EO sensor's recorded images (visual tracking history) will establish whether or not there were multiple moving objects in the EO sensor's field-of-view 68 at the time of the radar measurement. Only if there were not multiple moving objects would the radar measurement alone be validated.

Modes of Operation

The laser/electro-optical combination system 20 shown in FIGS. 1A–1B and the radar/electro-optical combination system 22 shown in FIGS. 5A–5B illustrate two embodiments of an active/passive combination system configuration of the present invention. Both combined active/passive systems 20, 22 can operate in five modes: a "dual operational" mode (FIGS. 7A–7B), a "passive-only" mode, an "active-only" mode, a "triggering" mode (FIGS. 8A–8B), and an "active recording" mode (FIG. 9) An active/passive system may be operated in any of these modes depending on the circumstances and desired results.

Figure 7A:
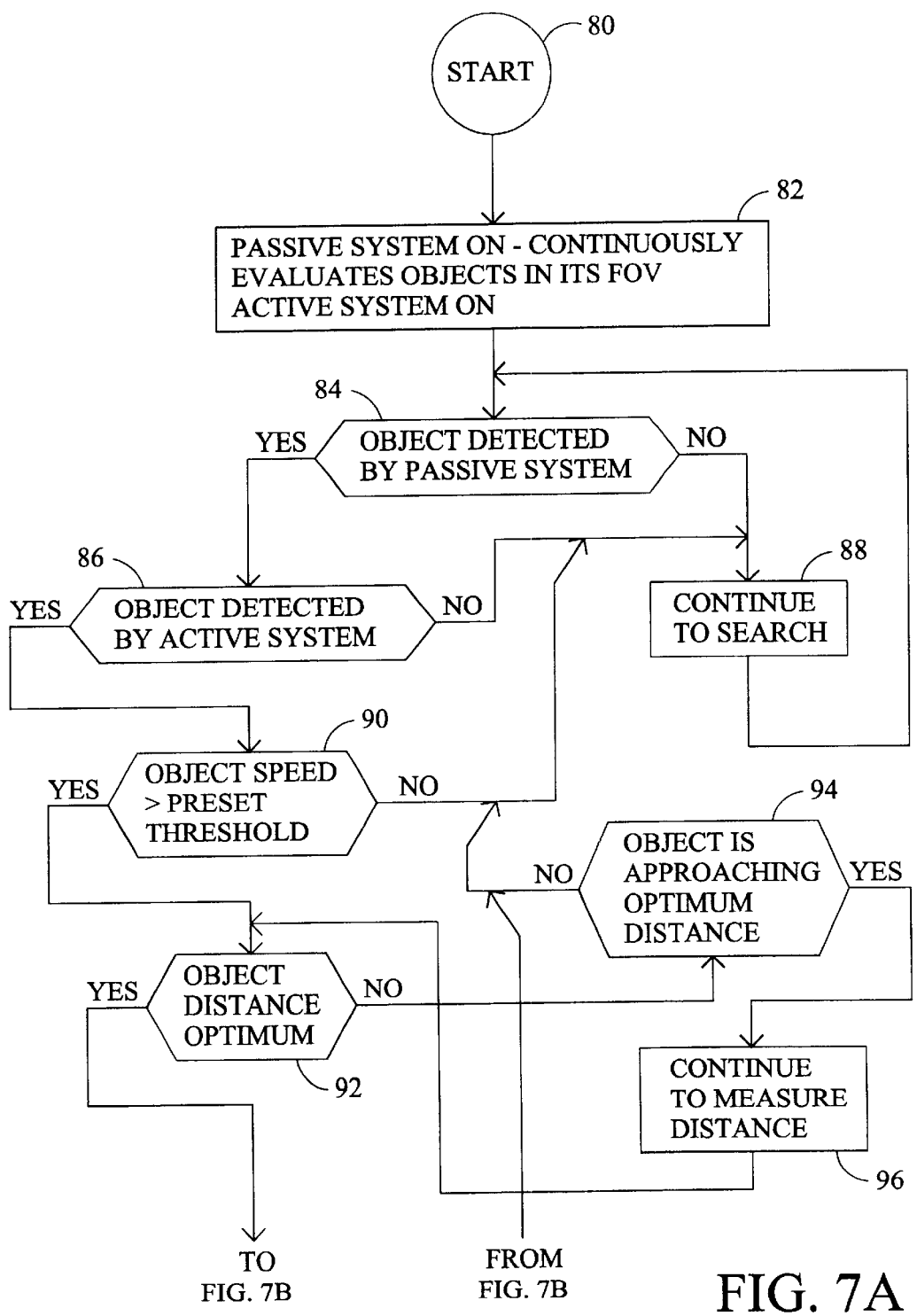
FIGS. 7A–7B are a flow chart for operations of the present invention in which both active and passive systems operate continuously.
Figure 7B:
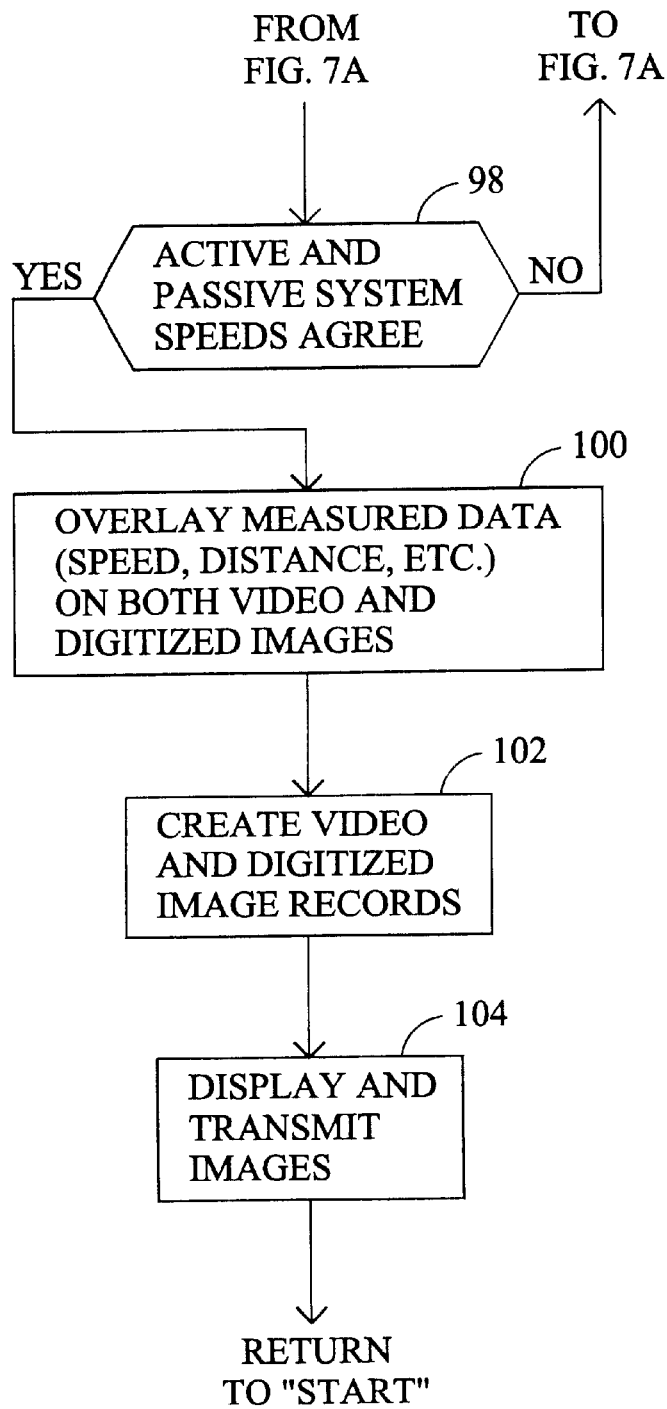

Turning to the "dual operational" mode shown in FIGS. 7A–7B, after initialization, both the passive and the active sensors are operational or "on" continuously. One advantage of this system is that it provides the quickest response to an object because there is minimal latency for both sensors and, therefore, fewer objects missed. Another advantage is the increased accuracy due to a longer time available to each sensor for measurement. However, because the active system is always operational, this mode would not be appropriate if stealth was a priority since the active system is easily detectable. Finally, an active/passive system used in the dual operational mode may be operated very effectively in an automatic, unmanned manner.

FIGS. 7A–7B show an exemplary-flow chart of the dual operational mode. After the combination system has been turned "on", started, or initialized 80 to the dual operational mode, both the active and passive systems are turned on 82. The passive system continuously evaluates objects in its field-of-view 82, 84 until an object is detected. If an object is detected by the passive system the system verifies that the object is detected by the active system 86. If not, the search is continued 88. However, if an object is detected by the active system, the system checks to determine if the object speed is greater than a preset threshold 90. If not, the search is continued 88. If the threshold has been reached, the system then checks to determine if the object is at a distance optimum for taking a measurement 92. If not, the system determines whether the object is approaching the optimum distance 94. If the object is approaching, the system continues to measure the distance 96 until the object distance is optimum 92. Both the active and passive systems take speed measurements and the system determines whether the active and passive system speed measurements agree 98. If not, then the measurement is invalidated and the system continues its search 88. If the speed measurements agree, the system outputs and/or records results. For example, as shown in FIG. 7B, the system overlays measurement data on the images 100, creates video and digitized image records 102, and displays and/or transmits images to a remote location 104. At this point the system resets itself 80 or otherwise continues monitoring activity in its field-of-view.

In the "passive-only" mode only the passive sensor, such as the EO sensor described in U.S. Pat. No. 5,586,063, which is assigned to the assignee of the present invention and is incorporated herein, is operational. In the "passive-only" mode, the combination system functions substantially like the system described in the patent. it should be noted that automatic operation is possible in this mode.

In the "active-only" mode only the active sensor, such as a radar system or a laser system, is operational. In the "active-only" mode, the combination system functions substantially like the active system (laser or radar) would function alone. It should be noted that this mode either cannot be used automatically (laser) or is relatively ineffective (radar) when unmanned.

Figure 8A:
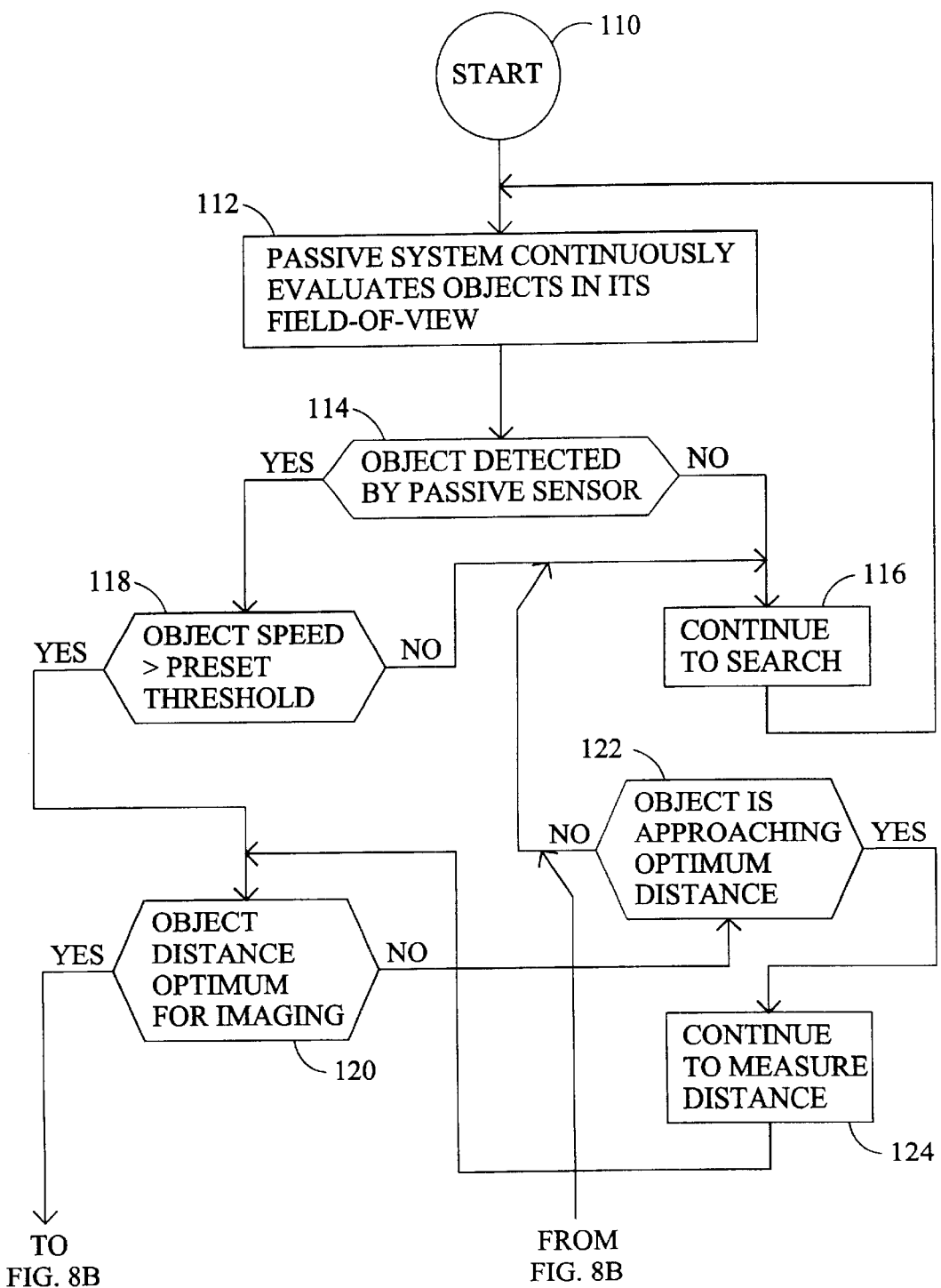
FIGS. 8A–8B are a flow chart for operations of the present invention in which the passive system triggers the active system.
Figure 8B:
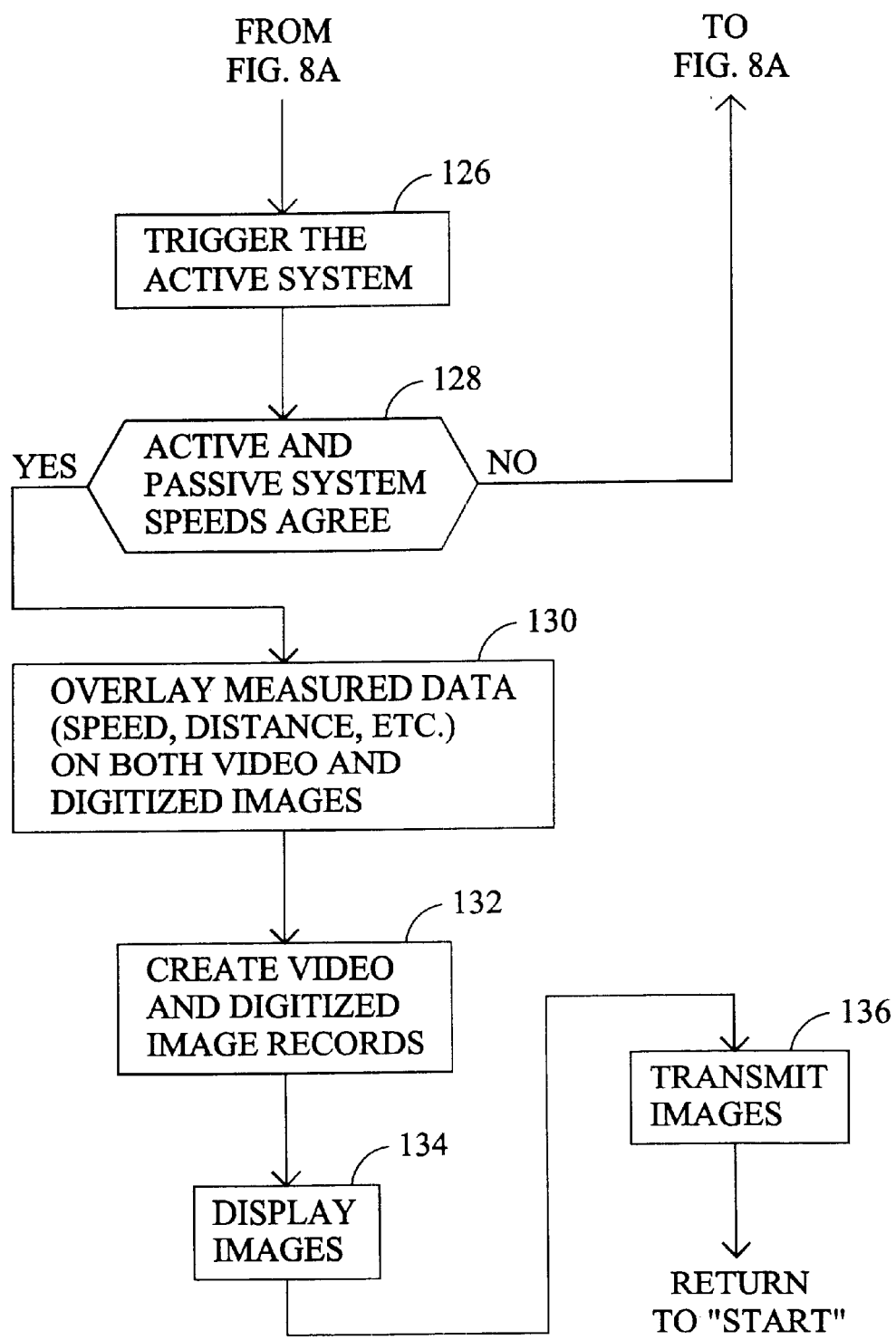

In the "triggering" mode shown in FIGS. 8A–8B, the passive system triggers the active system 20, 22. In the triggering mode the passive system monitors an object's speed and distance until the desired object is at an optimal distance. At this point the active system is activated. The triggering mode of operation is automatic and provides a stealth feature that is particularly desirable. Specifically, since the active system is only operational for short times, it is difficult to detect and, therefore, difficult to circumvent.

FIGS. 8A–8B show an exemplary flow chart of the triggering mode. After the combination system has been turned "on", started, or initialized 110 to the triggering mode, the passive system is turned on and continuously evaluates objects in its fields-of-view 112 until an object is detected. If an object is not detected by the passive sensor 114, then the system continues its search 116. If an object is detected by the passive sensor 114, the system checks to determine if the object speed is greater than a preset threshold 118. The system may also check to determine if the object is moving in a particular direction in the field-of-view of the passive system and may thus discriminate against objects that are not of interest because they come from the wrong direction. If not, the search is continued 116. If the threshold has been reached, the system then checks to determine if the object is at a distance optimum for imaging 120. If not, the system determines whether the object is approaching the optimum distance 122. If the object is approaching, the system continues to measure the distance 124 until the object distance is optimum 120. When the optimum distance is reached, a triggering event has occurred and the system triggers the active system 126 to take its speed measurement. The system then determines whether the active and passive system speed measurements agree 128. If not, the measurement is invalidated and the system continues its search 116. If the speed measurements agree, the system outputs and/or records results. For example, as shown in FIG. 8B, the system overlays measurement data on images 130, creates video and digitized image records 132, and displays and/or transmits images to a remote location 134, 136. At this point the system resets itself 110 or otherwise continues monitoring activity in its field-of-view. The system may respond to different types of triggering events such as motion in the field-of-view, optimal range, speed or a combination of any or all of these parameters.

Figure 9:
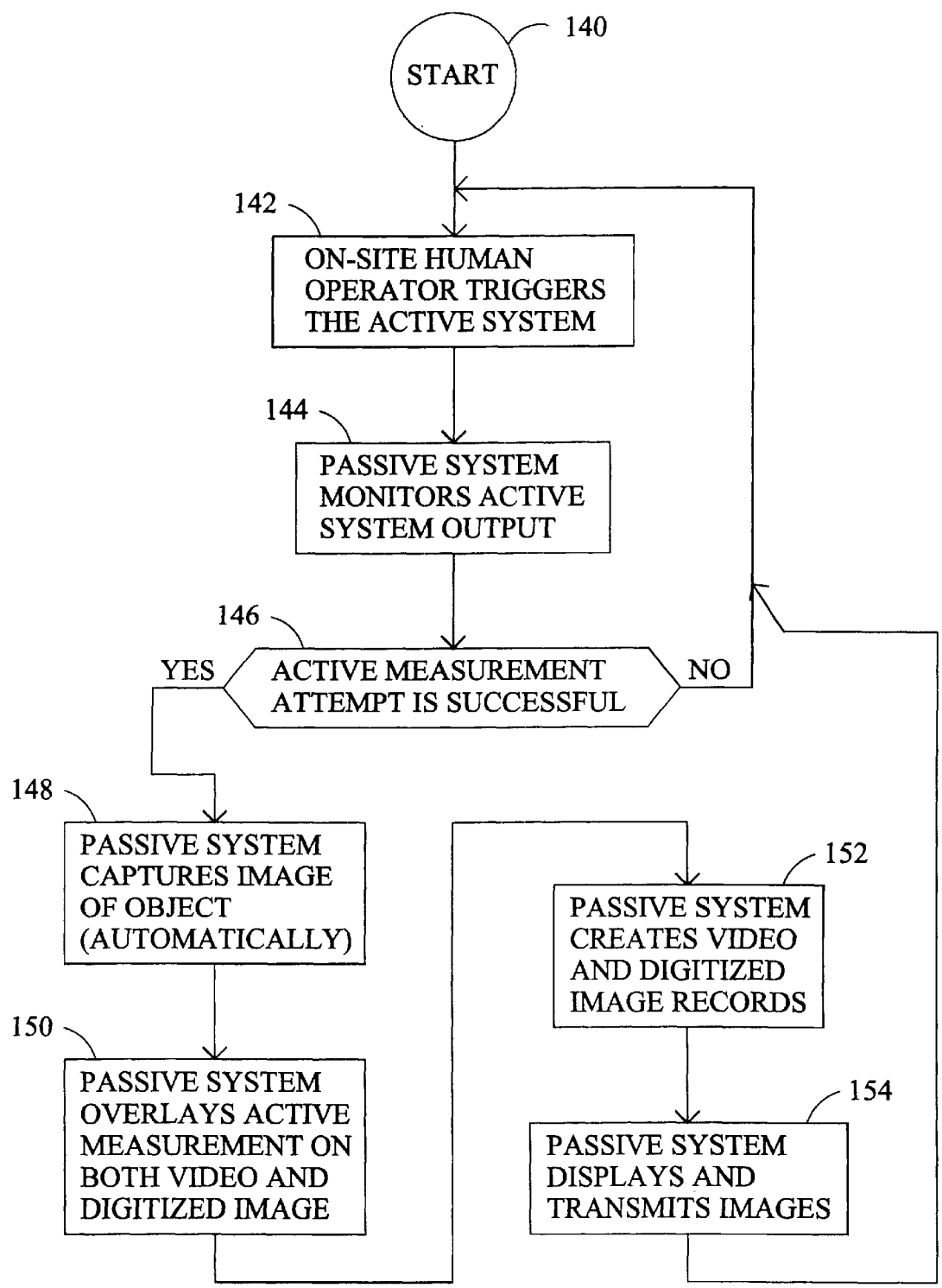
FIG. 9 is a flow chart for operations of the present invention in which the passive system is used only for recording images.

Finally, the "active recording" mode is shown in FIG. 9. In this mode of operation the active system is manually operated and part of the passive system is activated only to record images. Only the active system is used for speed measurement in this active recording mode of operation. This active recording mode of operation, however, has several advantages over the "active-only" mode of operation. For example, in this mode of operation the system has the capacity to capture, view, and record electronically the images of the targeted objects. The passive system replaces a film camera, and provides additional capabilities not available from a film camera. In this active recording mode the passive system allows verification that a radar active system measurement is unambiguous by verifying by means of visual and speed tracking histories that there are no moving objects in the vicinity other than the targeted object. Alternatively, in this active recording mode the passive system allows verification that a laser active system is targeting the correct object. It should 15 be noted, however, that this mode is not automatic and the system must be manned.

FIG. 9 shows an exemplary flow chart of the active recording mode. After the combination system has been turned "on", started, or initialized 140 to the active recording mode, an on-site human operator triggers the active system 142. The passive system monitors the active system output 144. If the active measurement attempt is successful 146 the passive system captures the image of the object automatically 148. The passive system then formats the output such as overlaying the active speed measurement on both video and digitized images 150. The passive system then creates video and digitized image records 152 and displays and/or transmits images to a remote location 154. At this point the system resets itself 140 or otherwise continues monitoring activity in its field-of-view.

Figure 10:
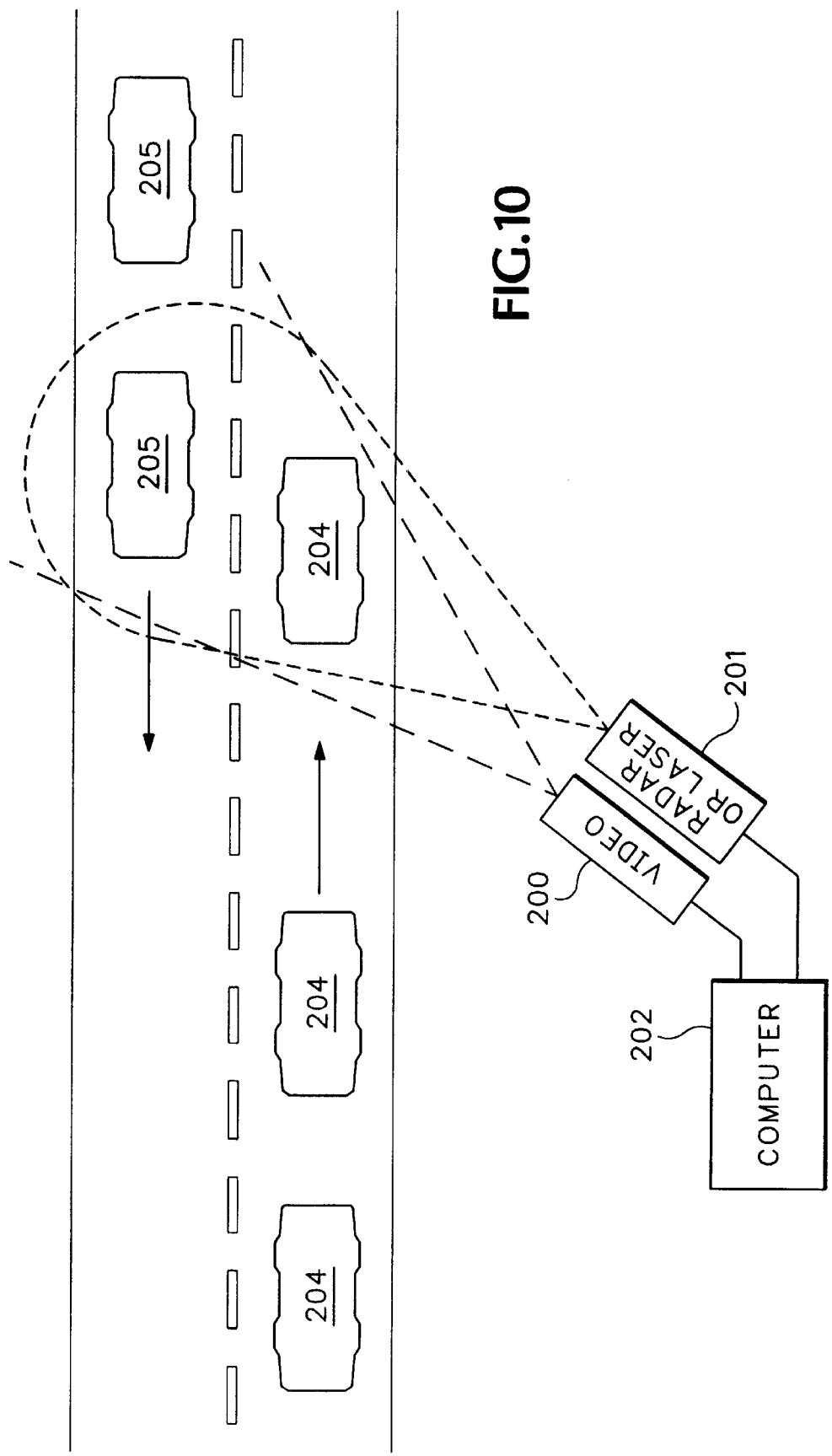
FIG. 10 is a schematic drawing of an alternative embodiment employing a single video detector.

An alternative to the system shown in FIGS. 1A, 2 and 5A and 6 is the system shown in FIGS. 10 and 10A which uses a single video camera 200 which functions as a motion detector. The system computer 202 turns the radar 201 on when motion of objects 204 and 205 is detected and then the video camera saves the images to form a tracking history if a preset speed threshold is exceeded. In such a case, motion in the field-of-view of the camera 200 may act as a triggering event to turn on the active system which then measures the speed of the object. Although the system is shown as having a radar detector as the active component, a laser could also be used.

The primary advantage to this system is that the radar may be left off for much of the time which significantly limits any usefulness provided by radar detectors which may be present in the vehicles being tracked. The radar is turned on only when motion is detected by the video camera and since the video camera is a totally passive device, it cannot be detected in operation.

According to this variation of the system, if motion is detected (block 210) it is checked for meeting a programable "event threshold" (block 212) that is designed to detect motion which is likely to be a vehicle approaching in the detection range of the radar. The event threshold may include parameters such as the amount of motion per unit, time and the location of the motion within the field-of-view of the video camera 200. If the motion does not meet this event threshold, the radar 201 is left off. If, however, the motion parameters do meet the event threshold, the radar 201 is turned on (block 214). There may be a slight delay built in to allow the vehicle to approach to optimum range and location in the radar's field-of-view. A radar reading is then attempted (block 216). In the event that a radar reading is not obtained during the time the event threshold is being met, the system goes back to the previous motion detection mode (block 218). If, however, a valid radar reading is obtained during the time the event threshold is being met, the system compares the radar speed data with the preprogrammed speed threshold (block 220). If that threshold is not exceeded, the system goes back to the previous motion detection mode (block 222).

If the radar reading exceeds the preprogrammed speed threshold, the data and image is digitally recorded (block 224). Radar speed, time, date and other information may be superimposed on a video retained by the video camera for later reference and a separate data file may also be kept. More than one image may be recorded forming a "visual tracking history" which shows the vehicle and its speed over the time the vehicle is in the system's field-of-view. This can greatly improve the identification of the vehicle and its driver and also verify that the vehicle is the valid radar target.

The recorded data and image may later be transferred to another computer for processing and analysis, either by direct connection, removable media such as floppy or ZIP® disc, wireless link or the Internet. As soon as the motion detection threshold is no longer being met, the radar is turned off (block 226). System internal diagnostics may now be performed to verify proper operation of the system especially the radar (block 228). Diagnostics may also be distributed within other parts of the program as required. Once diagnostic testing is completed, the system goes back to the motion detection mode.

The above set forth disclosure, although it deals with vehicles in particular, could be used for other moving objects. Also, the combination system of the present invention could be adapted for use with triggering events other than range or speed. For example, the system could detect stationary vehicles, vehicles coming to a stop, slow moving vehicles, vehicles running stop signs or stop lights, or vehicles moving at a speed different than (faster than or slower than) surrounding traffic.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A combination detection system for detecting the speed and range of moving objects, said combination system comprising:

a) a sensory unit including a passive speed and range detection system and an active speed detection system;

b) at least one output device;

c) a system controller, said system controller accepting input from said sensor unit and providing output to said at least one output device in the form of range data, speed data and/or video data;

d) said passive speed and range detection system being an electro-optical speed and range detection system including a first video input device with, a first video field-of-view and a second video input device with a second video field-of-view, said first and second video fields-of-view overlapping at least in part to form a common video field-of-view; and e) said active speed detection system being a laser speed and range detection system having a laser beam width, said video common fields-of-view extending laterally beyond said laser system beam width.

2. A combination detection system for detecting the speed and range of moving objects, said combination system comprising:

a) a sensory unit including a passive speed and range detection system and an active speed detection system;

b) at least one output device;

c) a system controller, said system controller accepting input from said sensor unit and providing output to set at least one output device in the for m of range data, speed data and/or video data;

d) said passive speed and range detection system being an electro-optical speed and range detection system including a first video input device with a first video field-of-view and a second video input device with a second video field-of-view, said first and second video fields-of-view overlapping at least in part to form a common video field-of-view; and e) said active speed detection system being a radar speed and range detection system having an angular beam width which extends laterally beyond said video common fields-of-view.

3. The combination system of claim 1 wherein said at least one output device is located remotely from said passive and active speed and range detection systems.

4. The combination system of claim 2 wherein said at least one output device is located remotely from said passive and active speed and range detection systems.

5. A method for detecting speed and distance of a moving object, said method comprising the steps of:

a) providing a passive electro optical speed and range detection system in a stationary location, said system including first and second video input devices spaced a predetermined distance apart and having overlapping fields-of-view, at least in part, to form a common video field of view;

b) providing an active speed and range sensing device;

c) passively monitoring said common video field-of-view to detect the presence of a moving object;

d) setting speed or distance parameters as triggering events;

e) evaluating said moving object for a triggering event when said moving object is detected within said common field-of-view and f) triggering said active speed and range sensing device if said moving object meets said speed or distance parameters.

6. A method for detecting speed and distance of moving objects, said method comprising the steps of:

a) providing an electro optical passive speed and range detection system including first and second video input devices with first and second fields-of-view, said first and second fields-of-view overlapping at least in part to form a common video field-of-view;

b) providing an active speed detection system;

c) continuously passively sensing said moving objects and passively measuring speeds of said moving objects with said passive electro optical sensor system;

d) evaluating said moving objects sensed by said passive electro optical sensor system for a triggering event caused by a triggering object wherein said triggering object is one of said moving objects;

e) activating said active sensor system upon the occurrence of said triggering event.

7. The method of claim 6 wherein said triggering event is a threshold speed of a moving object.

8. The method of claim 7 wherein said triggering event is a threshold range of a moving object.

* * * * *